Dec. 5, 1961    E. SCHRADE ET AL    3,011,199
WINDSHIELD WASHING MECHANISM
Filed May 8, 1957    3 Sheets-Sheet 1

Inventors
Eugen Schrade, Willy Bock
by Dicke and Craig
Attorneys

Dec. 5, 1961  E. SCHRADE ET AL  3,011,199
WINDSHIELD WASHING MECHANISM

Filed May 8, 1957  3 Sheets-Sheet 2

Inventors
Eugen Schrade, Willy Bock
by
Dicke and Craig
Attorneys

Dec. 5, 1961     E. SCHRADE ET AL     3,011,199

WINDSHIELD WASHING MECHANISM

Filed May 8, 1957     3 Sheets-Sheet 3

*Inventors*
*Eugen Schrade, Willy Bock*
by
*Dicke and Craig*
*Attorneys*

United States Patent Office 3,011,199
Patented Dec. 5, 1961

3,011,199
WINDSHIELD WASHING MECHANISM
Eügen Schrade, Ludwigsburg, and Willy Bock, Bietigheim, Germany, assignors to SWF-Spezialfabrik fur Autozubehor Gustav Rau G.m.b.H., Bietigheim, Germany, a German firm
Filed May 8, 1957, Ser. No. 657,976
Claims priority, application Germany May 12, 1956
14 Claims. (Cl. 15—250.02)

The present invention relates to an apparatus for washing the windshield of an automobile and more particularly to an apparatus for wetting a windshield with water or a cleaning fluid by means of a pump which operates in combination with a windshield wiper.

It is an object of the present invention to provide a fluid pump which is adapted to be connected at will to the reciprocating shaft of a motor of a windshield wiper so as to spray any desired quantity of water or cleaning fluid upon the windshield of a car to wash the same in cooperation with the windshield wiper which will thus be able to wipe all the dust and dirt off the window and really clean the same or at least the part thereof covered by the wiper blade.

It is already known to provide a windshield washing mechanism in which the pump is in constant positive engagement with the gear of the windshield wiper motor. The pump is thus actuated at every moment of the wiper motor and therefore subjected to considerable wear. Any breakdown of the pump caused by such excessive wear will therefore also block the operation of the wiper motor so that not only the washing mechanism but also the windshield wiper will then no longer operate. The washing mechanism of this prior device will start its actual operation of wetting the windshield after a valve has been opened which is provided in the intake pipe for the washing liquid. In other words, until such valve is opened, the pump will always carry out idle pumping strokes as long as the windshield wiper motor operates.

It is a further object of the present invention to overcome the mentioned disadvantages of the prior art by providing a fluid pump of any reciprocating type which may be mechanically connected at will to the wiper motor or be disconnected therefrom by suitable control means so that the pump will only operate temporarily when necessary.

According to the invention, the pump may either be designed so as to form a single unit integral with the windshield wiper motor or to form a separate element which may be subsequently mounted on a wiper motor which is already installed in a car. The driving means for the pump preferably consist of an eccentric disk or cam which is mounted on the shaft of the wiper motor and may either be built into the wiper motor or be subsequently secured thereto. For carrying out a pumping stroke, the pump shaft is provided with a spring which holds the end of such shaft or of an intermediate connecting rod in sliding engagement with the eccentric disk or cam on the reciprocating shaft of the wiper motor so that during the ascending movement of the cam the pump shaft is moved into its housing, while during the descending movement of the cam the spring on the pump shaft automatically moves the latter back to its outward position so as to remain in engagement with the cam on the motor shaft.

A further object of the invention is to provide simple control means for disengaging the pump shaft from the windshield wiper motor so as to stop the operation of the pump independently of the movement of the wiper motor.

A preferred embodiment of the invention consists of a solenoid having a slidable core or armature within its coil with a locking member mounted on the free outer end of the core and a spring which, when the solenoid is not energized, is adapted to maintain the core withdrawn from the coil and thus the locking member in engagement with a shoulder on the pump shaft or on the connecting rod between the pump shaft and the cam on the shaft of the wiper motor. Thus, when a suitable electric switch is closed to energize the solenoid, the core is drawn into the coil and the locking member thus disengaged from the pump shaft so that the latter can then engage with the cam on the shaft of the wiper motor and be reciprocated thereby to carry out its pumping strokes and to wet the windshield with water or a cleaning solution which is then distributed over and wiped off the windshield by the wiper blade. As soon as the switch is opened and the solenoid thus deenergized, the spring on the solenoid core moves the locking member to its outward position. The locking member has at one side a tapered surface. Near the end of the next ascending movement of the cam on the shaft of the wiper motor, the shoulder on the pump shaft or on the intermediate connecting rod will engage with the tapered surface of the locking member, thereby pressing the latter toward the solenoid coil until, when the cam has depressed the pump shaft to its farthest point into the pump housing, the shoulder on the pump shaft or intermediate member slides in front of the locking member which, by the action of its spring then snaps behind the shoulder and thus locks the pump shaft in its depressed position, so that during the continued movement of the windshield wiper, the cam on the wiper motor will be disconnected from the pump shaft and only lightly touch the same at the peak of its movement toward the pump.

A further object of the invention is to balance the forces acting upon the windshield wiper motor so that the additional torque required thereof to operate the pump will not exert any undue strain upon the motor.

Since the torque to be produced by the windshield wiper motor to carry out the wiping function is not uniform but sinusoidal during each rotation of the motor shaft, the present invention provides that the cam for driving the pump will preferably be disposed on the motor shaft in such a position that the actual driving force to move the pump shaft in only one direction will be furnished by the wiper motor within the period during which it has to furnish the minimum torque for operating the wiper blade.

Further objects, features, and advantages of the present invention will be apparent from the following detailed description thereof, particularly when read with reference to the accompanying drawings, in which—

FIG. 6 shows a wiring diagram of the electric circuit according to the invention connecting a windshield wiper motor, a solenoid for locking and releasing the pump shaft, and a single switch for operating the motor and solenoid, while

Figure 1:
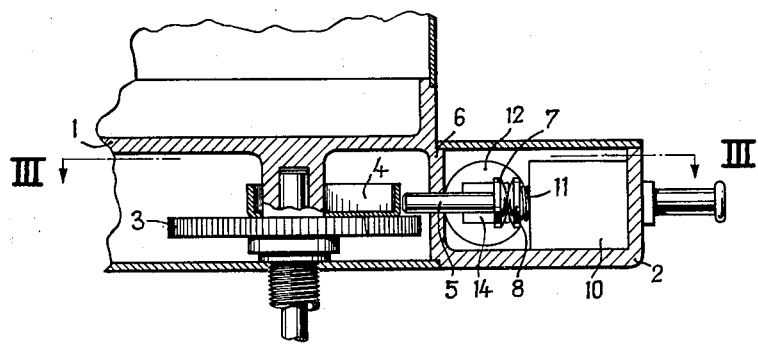
FIG. 1 shows a side view, partly in cross section, of a pump housing according to the invention which is combined with the housing of a windshield wiper motor so that both housings together form a single integral unit.
Figure 2:
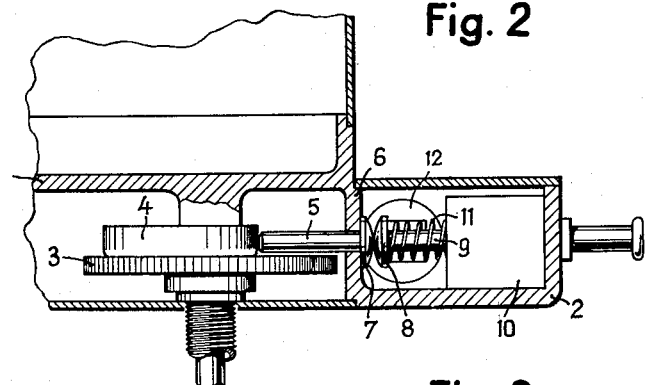
FIG. 2 shows a view similar to FIG. 1, but with the pump being in the opposite operative position.
Figure 3:
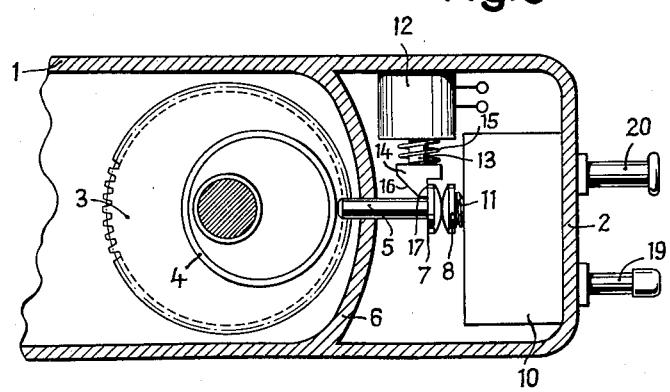
FIG. 3 shows a cross section taken along line I—I of FIG. 1, but with the pump in the locked position.

Referring to the drawings, and first particularly to FIGS. 1 to 3, the gear housing 1 of a windshield wiper motor and the housing 2 of a fluid pump are designed according to the invention to form a single one-piece unit. A gear 3 of windshield wiper motor 1 which is driven by a suitable transmission carries an eccentric wheel 4 which engages with a small plunger 5 which is slidably mounted within a partition 6 separating housings 1 and 2 from each other. Plunger 5 has a head 7 which engages with a head 8 of a plunger 9 which serves as a pump shaft for operating a reciprocating pump 10 of any suitable type within housing 2. Plunger 9 carries a coil spring 11 which tends to return this plunger to its outer position and to maintain plunger 5 normally in engagement with the peripheral surface of eccentric wheel 4. Thus, during the ascending part of the rotation of eccentric wheel 4, the same pushes plunger 5 outwardly which, in turn, pushes plunger 9 into pump 10 and thus carries out a pumping stroke. During the descending part of the rotation of eccentric wheel 4, coil spring 11 then returns plunger 9 to its outer position and maintains plunger 5 in constant engagement with eccentric wheel 4.

Housing 2 further contains a solenoid with a coil 12 which is mounted on one side wall of housing 2 and a core or armature 13 which is slidably mounted within coil 12 and has a head 14 on its outer end and a coil spring 15 interposed between coil 12 and head 14 for withdrawing core 13 from coil 12 when the latter is de-energized. Core head 14 has a beveled surface 16 on one side and a flat surface 17 on the other side and serves as a locking member for automatically stopping the operation of pump 10 when coil 12 is de-energized. During the time while coil 12 is energized by the operation of a suitable switch, for example, of the type as designated with 18 in FIG. 6 and as subsequently described, core 13 will be drawn into coil 12 and head 14 will be disengaged from plunger head 7. Thus, during the continued rotation of windshield wiper motor 1, plungers 5 and 9 will be reciprocated by being moved in one direction by eccentric wheel 4 and in the other direction by spring 11. Pump 10 will thus operate, and the water or cleaning fluid drawn from a suitable container 19' or the radiator of the car through an inlet 19 will be passed from the pump through an outlet 20 to the windshield W of the car where it is distributed by one or more suitable nozzles 20' and wiped off by the wiper blade 20" to leave that part of the windshield W covered by the blade perfectly clean. As soon as a sufficient amount of water or cleaning fluid is sprayed upon the windshield W, switch 18 may be released so that, while the wiper motor continues to run, plunger 5 will, during its outward stroke engage with its head 7 against the beveled surface 16 on core head 14 and push the latter upwardly against the force of spring 15. When plunger 5 reaches its outermost position, as shown in FIG. 3, core head 14 snaps downwardly and engages with its flat surface 17 behind plunger head 7, thereby locking both plungers 5 and 9 and stopping the operation of pump 10. The core 13 and head 14 together thus form a locking bar.

Figure 4:
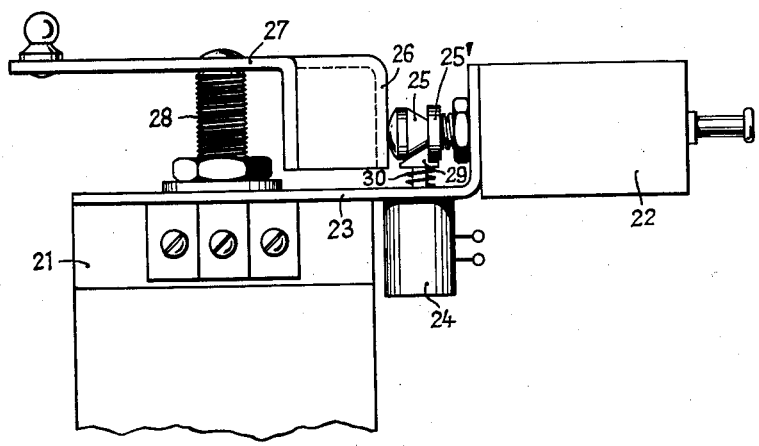
FIG. 4 shows a modification of the invention, in which the pump forms a separate element which is attached to the housing of the motor of a standard windshield wiper.
Figure 5:
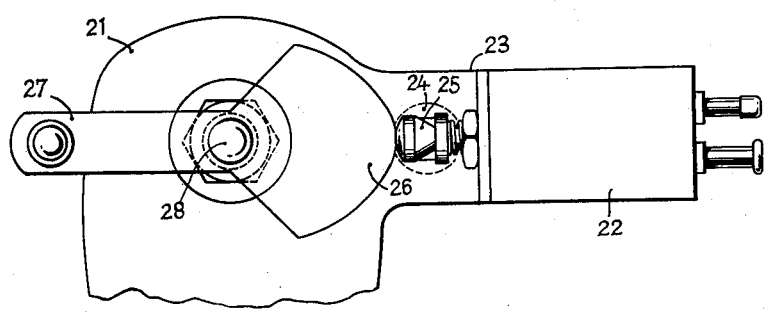
FIG. 5 shows a plan view of FIG. 4.
Figure 7:
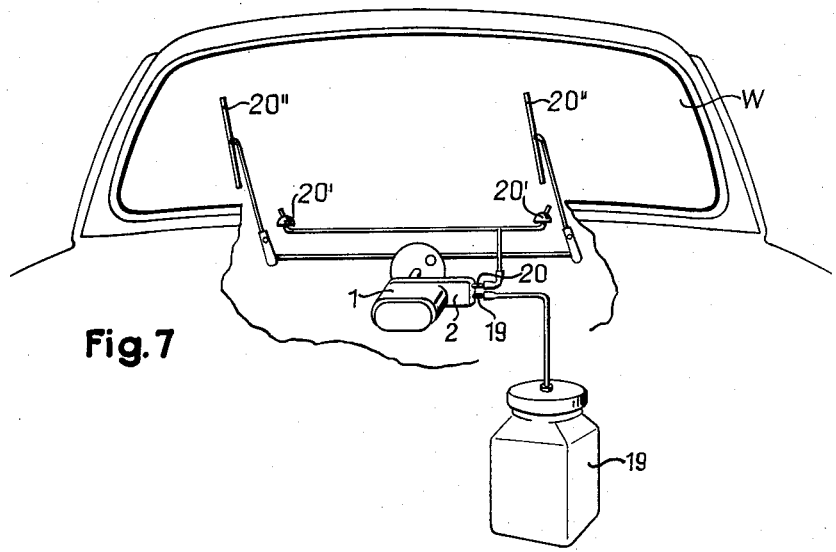
FIG. 7 shows diagrammatically the assembly of the windshield wiper and the wiper motor according to the embodiment shown in FIGS. 1 to 3, as being mounted in a car.

The modification of the invention as illustrated in FIGS. 4 and 5 differs from the embodiment shown in FIGS. 1 to 3 principally by the fact that the motor housing 21 and the pump housing 22 form two separate elements. Pump housing 22 is secured to motor housing 1 by means of a bracket 23 which also carries the solenoid 24. Instead of being provided with a separate connecting rod or plunger 5, as in FIGS. 1 to 3, the shaft 25 of the pump engages directly upon the outer surface of a cam 26 on one end of a crank arm 27 which is mounted on shaft 28 of the motor and the other end of which is adapted to drive the windshield wiper. The locking head 29 on the slidable core of solenoid 24 is similar to that shown in FIGS. 1 to 3, and when solenoid 24 is deenergized, its core is withdrawn from the coil by a spring 30 so as to move member 29 into locking engagement with a shoulder 25' on shaft 25 substantially in the same manner as previously described with respect to FIGS. 1 and 2. When a suitable switch is then closed, solenoid 24 will be energized, the core thereof will be drawn into its coil and locking head 29 be withdrawn from pump shaft 25 so that cam 26 will now be able to reciprocate pump shaft 25. The pump will then spray water or cleaning fluid upon the windshield until the switch is released, whereupon pump shaft 25 will again be locked at the end of its inward stroke.

Figure 6:
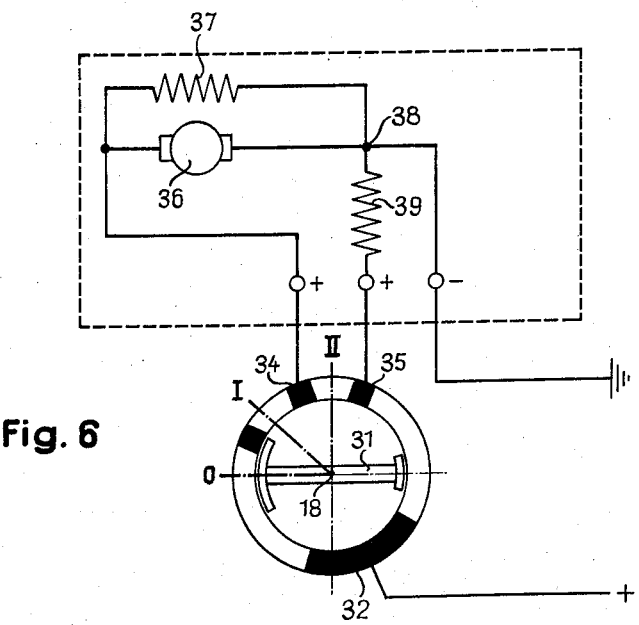

FIG. 6 shows a preferred wiring diagram according to the invention for controlling the operation of the windshield wiper motor and the solenoid as shown in FIGS. 1 to 5 by means of a selector switch 18 which is adapted to be moved to three different positions. This switch comprises a bridge member 31 which is adapted to be turned about its central axis to connect a wide contact 32 which is connected to the battery with spaced contacts 34 and 35. When bridge member 31 is turned from its off position to the position I as indicated in FIG. 6 in dot-and-dash lines, the current flows from the battery through contact 32, bridge member 31 and contact 34 to windshield wiper motor 36, and then through the shunt winding 37 connected in parallel with motor 32 to a point 38 and back to the battery. Thus, in this position of switch 18, the wiper motor 36 will alone be connected.

When bridge member 31 is then further turned to the position II, the current flows from the battery through contact 32 and bridge member 31 to both contacts 34 and 35 so that, while motor 36 continues to rotate, coil 39 of the solenoid will also be energized whereby the locking head 14 or 29, as shown in FIGS. 1 to 5, will be withdrawn from the pump shaft, thus permitting the pump to operate. A return movement of bridge member 31 to position I will thereafter deenergize coil 39 so that locking head 14 or 29 will again lock the pump shaft and stop the operation of the pump while the windshield wiper continues to operate until the switch is turned to its off position shown in FIG. 6.

Although our invention has been illustrated and described with reference to the preferred embodiments thereof, it is to be understood that it is in no way limited to the details of such embodiments but is capable of numerous modifications within the scope of the appended claims. Thus, for example, instead of providing a rotary switch as illustrated in FIG. 6, the switch may be of a pushbutton or other suitable type. Whatever type of switch may be provided, the same may also be designed so that, when the pushbutton, knob or control handle of the switch is released after the switch has been moved to the position in which both the wiper motor and the solenoid are energized, the switch will automatically return to the position in which the wiper motor alone will operate. Furthermore, instead of providing a solenoid to lock or release the pump shaft, the locking member may also be operated mechanically by any suitable means, for example, by a Bowden wire or the like.

Having thus fully described our invention, what we claim as new is:

1. In a windshield washing mechanism, particularly for an automobile having a windshield wiper, a motor for operating said wiper, driving means mounted on the shaft of said motor, and a fluid pump adapted to be secured to said automobile adjacent to said motor, said fluid pump comprising a housing and at least one plunger adapted to be operatively connected to said driving means to be reciprocated substantially within said housing; the improvement comprising means for instantaneously stopping the operation of said pump without affecting the continued operation of said wiper motor, said stopping means comprising a locking bar, resilient means adapted to move said bar instantaneously into locking engagement with said plunger so as to hold said plunger in a fixed position when substantially depressed into said pump housing by said driving means, and quick-acting means for instantaneously withdrawing said bar from said plunger to permit said plunger to be reciprocated by said driving means.

2. In a windshield washing mechanism, particularly for an automobile, having a windshield wiper, a motor for operating said wiper, an eccentric member mounted on and rotated by the shaft of said motor, and a fluid pump having a housing adapted to be secured to said motor, a plunger slidably mounted for reciprocatory movement within said housing for operating said pump and having one end projecting to the outside of said housing, and a spring acting upon said plunger and tending to withdraw said plunger from said housing and to maintain said projecting end in engagement with said eccentric member; the improvement comprising a locking bar slidably mounted intermediate said motor and said pump for movement within a plane perpendicular to the axis of said plunger, said bar and said projecting end of said plunger having locking parts thereon adapted to interengage with each other to lock said plunger in a fixed position when depressed by said eccentric member substantially to the innermost position within said housing during a part of each revolution of said motor shaft, electromagnetic means for instantaneously withdrawing said bar from a position in which said locking parts are interengaged, and resilient means for instantaneously moving said bar into said last-named position when said electromagnetic means are de-energized.

3. In a windshield washing mechanism as defined in claim 2, wherein at least one of said locking parts on said plunger and said locking bar has an inclined surface adapted to engage with and slide along the other said part when said plunger is being depressed into said housing while said electromagnetic means are de-energized, said one part making locking engagement with the other said part when said plunger is depressed into its innermost position within said housing.

4. In a windshield washing mechanism as defined in claim 2, wherein said electromagnetic means comprise a solenoid coil, one end of said locking bar being disposed within said solenoid and forming a slidable core therein adapted to be drawn into said coil when said coil is energized, said resilient means comprising a spring adapted to withdraw said core substantially from said coil when said coil is not energized, said locking part on said bar having an angularly inclined surface, said locking part on said plunger comprising a projection, said projection being adapted to engage with said inclined surface to cam said core into said coil while said plunger is being depressed into said housing by said eccentric member toward said farthest inward position, said locking part being on said bar being adapted under the action of said spring to snap into locking engagement with said projection on said plunger when said plunger is depressed into said farthest inward position.

5. In a windshield washing mechanism as defined in claim 2, wherein said wiper motor has a housing, said pump housing being integral with said motor housing so as to form a single unit.

6. In a windshield washing mechanism as defined in claim 2, wherein said eccentric member is mounted on the shaft of said motor in such a position relative to said pump that said pump plunger will be depressed into said pump housing during the period when said motor has to produce a minimum torque during the operation of the windshield wiper.

7. In a windshield mechanism, particularly for an automobile, having a windshield wiper, a motor for operating said wiper, an eccentric member mounted on and rotated by the shaft of said motor, and a fluid pump having an outer housing adapted to be secured to said motor, and a plunger slidably mounted for reciprocatory movement within said housing for operating said pump; the improvement comprising a second plunger slidably mounted for reciprocatory movement within said housing intermediate said eccentric member and said first plunger and having one end projecting to the outside of said housing, said projecting end being adapted to be engaged by said eccentric member when said pump is secured to said motor so that, when said motor shaft is rotated, said eccentric member will depress said second plunger substantially into said housing during a part of each revolution of said motor shaft, and so that the inner end of said second plunger within said housing will thereby act upon said first plunger to produce a pumping stroke of said pump, a spring mounted on said first plunger to withdraw said first plunger substantially from said pump into said housing and to maintain said projecting end of said second plunger in engagement with said eccentric member during another part of the revolution of said motor shaft, a locking bar slidably mounted within said housing for movement within a plane perpendicular to the axis of said second plunger, means on said locking bar and on said second plunger adapted to interengage with each other to lock said second plunger in a fixed position when said second plunger has been moved to substantially its innermost position within said housing by said eccentric member, electromagnetic means for instantaneously withdrawing said bar from a position in which said means are interengaged, and resilient means for instantaneously moving said bar into said last-named position.

8. In a windshield washing mechanism for an automobile having a wiper, a motor for operating said wiper, a fluid pump adapted to be secured to said automobile adjacent said wiper and having a plunger, means for connecting said plunger to said motor, said means including a rectilinearly movable member capable of assuming operative positions in which said plunger is operated by said motor and a second position in which said plunger is not operated by said motor, and means including rectilinearly movable means for controlling the assumption by said member of said operative positions and of said second position.

9. In a windshield washing mechanism according to claim 8, wherein said rectilinearly movable means includes a bar having first locking means thereon and said rectilinearly member is comprised by a plunger member having second locking means thereon, said first locking means being engageable with said second locking means for holding said plunger member in said second position.

10. In a windshield washing mechanism according to claim 8, wherein said rectilinearly movable means is movable to a position in which the said first locking means thereon is free of engagement with said second locking means and in which position of said rectilinearly movable means said rectilinearly movable member is moved into said operative positions.

11. In a windshield washing mechanism for an automobile having a wiper and a motor for operating said wiper, a fluid pump adapted to be secured to said automobile adjacent said wiper and having a pump plunger, means for connecting said pump plunger to said motor for operation of said pump plunger by said motor, said means including a plunger member movable in a rectilinear path and further including means for moving said plunger member along said path into operative positions in which said pump plunger is operated by said motor and into a further position in which said pump plunger is not operated by said motor, said means including a locking means movable in directions normal to said path for controlling the assumption by said plunger member of said operative positions and of said further position.

12. In a windshield washing mechanism according to claim 11, wherein said locking means is provided with a first locking member and said plunger member is provided with a second locking member, said first locking member being engageable with said second locking member for locking said plunger member in said further position when said locking means is moved in one of said directions.

13. In a windshield washing mechanism according to claim 12, wherein said locking means is movable in the other of said directions to a position in which said plunger member occupies said operative positions and in which said first locking member is disengaged from said locking member.

14. In a windshield mechanism for an automobile having a windshield wiper and motor means for driving said wiper including a drive shaft, a crankarm mounted on said shaft, one end of said crankarm being adapted to drive said wiper, the improvement comprising cam means mounted on the other end of said crankarm, and a fluid pump having an outer housing secured to said motor means and a plunger slidably mounted for reciprocatory movement within said housing for operating said pump, said cam means engaging said plunger when said pump is secured to said motor so that, when said motor means drives said crankarm, said cam means depresses said plunger substantially into said housing during a part of each operation of said crankarm to produce a pumping stroke of said pump, a spring mounted on said plunger to withdraw said plunger substantially from said pump and to maintain the projecting end of said plunger in engagement with said cam means during another part of the operation of said crankarm, a locking bar slidably mounted within said housing for movement within a plane perpendicular to the axis of said plunger, means on said locking bar and on said plunger adapted to interengage with each other to lock said plunger in a fixed position when said plunger has moved to substantially its innermost position within said housing by said cam means, electromagnetic means for instantaneously withdrawing said bar from a position in which said means are interengaged and resilient means for instantaneously moving said bar into said last-named position.

References Cited in the file of this patent

UNITED STATES PATENTS

| | | |
|---|---|---|
| 2,059,224 | French | Nov. 3, 1936 |
| 2,350,678 | Grimsley | June 6, 1944 |
| 2,528,653 | Hedquist | Nov. 7, 1950 |
| 2,528,669 | Schoenrock | Nov. 7, 1950 |
| 2,878,505 | Ziegler | Mar. 24, 1959 |